July 7, 1964

D. M. PETERSON 3,139,805

FLASH LAMP SYNCHRONIZING MECHANISM

Filed Oct. 24, 1962

DEAN M. PETERSON
INVENTOR.

BY R. Frank Smith
Robert W. Hampton
ATTORNEYS

July 7, 1964          D. M. PETERSON          3,139,805

FLASH LAMP SYNCHRONIZING MECHANISM

Filed Oct. 24, 1962          2 Sheets-Sheet 2

DEAN M. PETERSON
INVENTOR.

BY R. Frank Smith
Robert W. Hampton
ATTORNEYS

United States Patent Office 3,139,805
Patented July 7, 1964

1

3,139,805
FLASH LAMP SYNCHRONIZING MECHANISM
Dean M. Peterson, Rochester, N.Y., assignor to Eastman
 Kodak Company, Rochester, N.Y., a corporation of
 New Jersey
Filed Oct. 24, 1962, Ser. No. 232,810
4 Claims. (Cl. 95—11.5)

This invention relates to mechanisms for synchronizing the operation of a camera shutter with the firing of a flash lamp, and more particularly to such mechanisms wherein the opening of said camera shutter can be adjusted to coincide with the peak illumination of different types of flash lamps.

In a recent development in the art (see application of M. R. Hutchison, Serial No. 204,436), a novel method for firing flash lamps has been devised wherein the circuit energizing the flash lamp is shunted by a second circuit. According to this method, the flash lamp energizing circuit is closed in response to the depression of the shutter release lever by the camera operator, but this does not immediately fire the flash lamp due to the shunting effect of the second circuit. The firing of the flash lamp is automatically controlled thereafter by the opening of the shunting circuit in response to the operation of the camera's shutter mechanism.

The invention herein is an improvement utilizing the above-described method in a novel mechanism designed for use in inexpensive cameras, the relatively simple mechanism being provided with means for adjusting the time lapse between the opening of the shunt circuit and the opening of the shutter to synchronize the latter with the peak illumination of the particular type of flash lamp being used.

It is an object of this invention to provide a new and improved mechanism for synchronizing the firing of a flash lamp and the opening of a camera shutter.

Another object is to provide a control mechanism for firing a flash lamp in timed relation to the opening of the camera shutter, the operation of this mechanism being independent of the speed at which the operator depresses the camera's release lever.

A further object is to provide a simple, economical mechanism for use in inexpensive cameras whereby the timing sequence for the firing of a flash lamp is easily adjustable to assure the synchronization of the opening of the camera's shutter with the peak illumination of the particular type of flash lamp used.

These and other important objects of the invention will be readily apparent from the following description and the accompanying drawings in which like reference characters designate corresponding parts throughout the several views, and in which.

Figure 8:
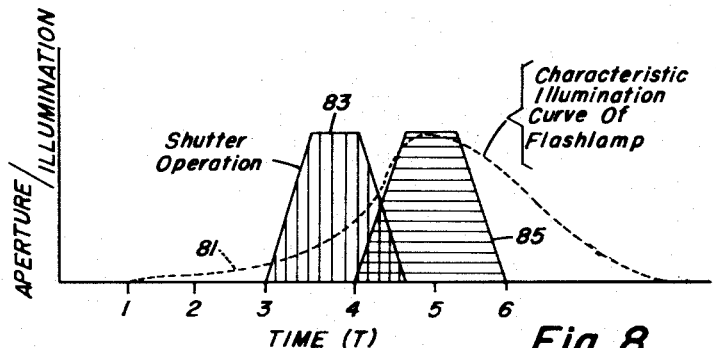
Figure 2:
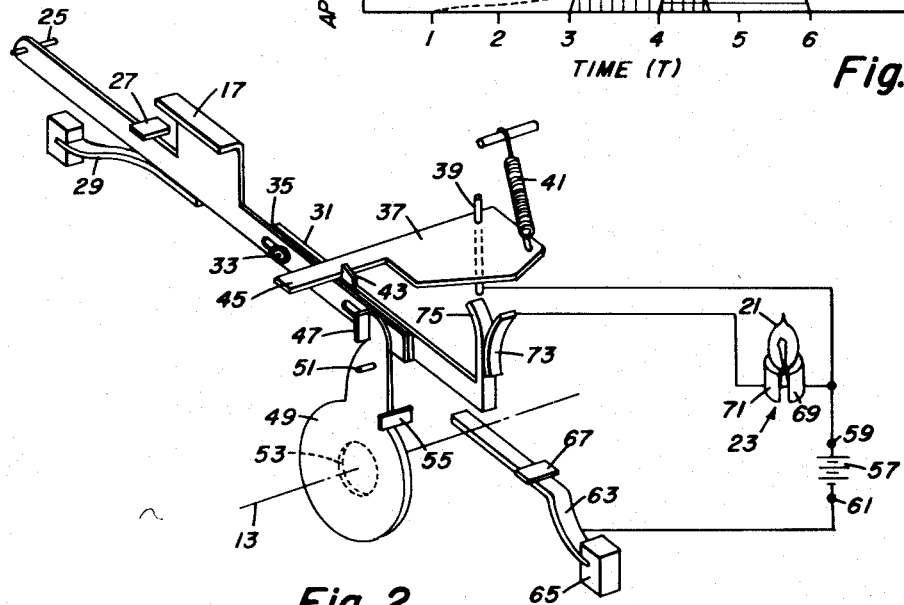
FIG. 2 is a simplified and partially schematic view of certain parts of a camera utilizing the invention herein, all camera parts not essential to an understanding of the invention being omitted.

FIGS. 3, 4, 5, 6, and 7 illustrate the basic parts shown in FIG. 2 in various sequential relationships which occur during the operation of the disclosed mechanism when the operator depresses the camera's shutter trigger lever;

FIG. 8 is a graphic representation comparing two possible timing relationships between the opening of the circuit shunting the flash lamp (i.e., the firing of the flash lamp) and the opening of the camera shutter.

Figure 1:
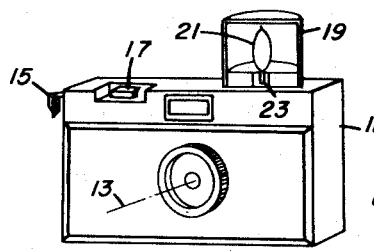
FIG. 1 illustrates a simple camera of the type in which the invention herein may be incorporated.

FIG. 1 illustrates a typical inexpensive camera of the type in which the invention herein may be utilized. The camera has a conventional casing 11, a picture-taking axis 13 in line with which are mounted the camera's usual lens and shutter systems as well as the sensitive film surface to be exposed. Film is advanced in the camera and the camera shutter mechanism is cocked by the operation of the film winding lever 15, while the depression of shutter trigger lever 17 by the camera operator results in the usual exposure of the film.

The camera is also provided with a "pop-up" flash unit 19 in which a flash lamp 21 may be received by a socket 23. Depression of shutter trigger lever 17 by the operator fires flash lamp 21, and the timed relationship between the firing of flash lamp 21 and the opening of the camera's shutter is controlled by a simple mechanism which will now be described in detail.

Referring now to FIG. 2, shutter trigger lever 17 is pivotally mounted on pin 25 and is normally biased against stop 27 by spring 29. Adjustable latching bar 31 is attached to shutter trigger lever 17 by means of screws 33 and is separated therefrom by insulation 35. In the position illustrated in FIG. 2, the camera shutter mechanism is cocked and ready to respond to the depression of shutter trigger lever 17 by the camera operator. In this position, shutter striking plate 37, which is rotatably mounted on axis 39 and strongly biased in a counterclockwise direction by spring 41, is latched by detent 43 of adjustable latching bar 31. When the camera operator depresses trigger lever 17, shutter striking plate 37 is released by detent 43 and rotates rapidly in a counterclockwise direction. This permits finger 45 of striking plate 37 to strike ear 47 of impact shutter blade 49 to rotate around pin 51 in a clockwise direction and thereby momentarily uncapping the camera's picture-taking aperture (represented generally as the circular opening 53). As thus described, it can be seen that shutter striking plate 37 and shutter blade 49 are merely conventional components of an impact shutter mechanism of the type well known in the art, it being understood that the motion of striking plate 37 is arrested by a stop (not shown) and shutter blade 49 is returned against stop 55 by a shutter spring mechanism (also not shown).

The electrical potential for the firing of flash lamp 21 is provided by batteries 57 which are appropriately received within camera casing 11 to make proper electrical connection with battery terminals 59 and 61. Terminal 61 is electrically connected to spring contact 63 which is suitably anchored to the camera casing at 65 and is normally biased against stop 67. One contact 69 of flash lamp socket 23 is connected to both battery terminal 59 and to axis 39 of shutter striking plate 37, the last two mentioned items being made of electrically conductive material. The other contact 71 of flash lamp socket 23 is connected to brush contact 73 which is designed to make electrical contact at all times with switch arm 75, the latter being integral with adjustable latching bar 31. Switch arm 75 is also made of electrically conductive material and is designed so that it will make electrical connection with spring contact 63 whenever the camera operation depresses shutter trigger lever 17.

(A) *Flash Lamp Operation*

Figure 3:
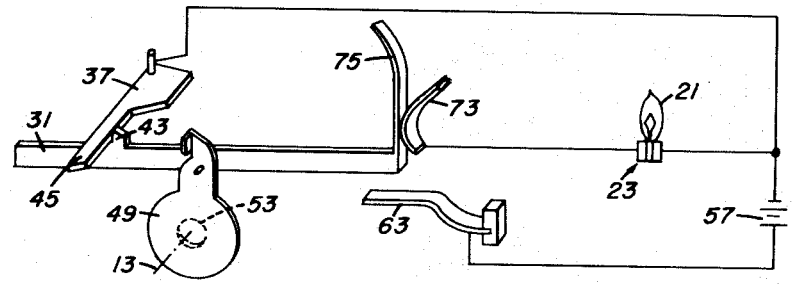

Following each advancement of the film and cocking of the shutter mechanism in response to the operation of lever 15, the various camera parts essential to the understanding of the disclosure herein are in the relative positions illustrated in FIGS. 2 and 3.

The firing of a flash lamp by the mechanism just disclosed will now be described in detail with reference being made to FIGS. 3 through 7 which illustrate various parts of the mechanism in the sequential relationships that occur in response to the operation of trigger lever 17 by the camera operator. It is assumed that the operator has placed an unused flash lamp 21 into socket 23 of the pop-up flash unit 19 as illustrated in FIG. 1.

Figure 4:
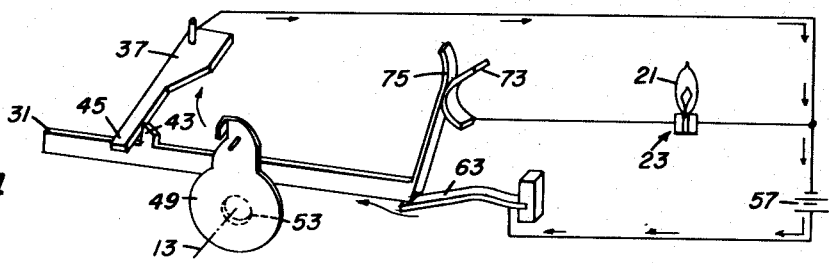

In this initial position, the camera's electrical circuit is open at spring contact 63. As the operator begins to depress trigger lever 17, adjustable latching bar 31 begins to rotate in a clockwise direction about the axis established by pin 25. As latching bar 31 starts its downward motion, and before finger 45 of shutter striking plate 37 is released by detent 43, the elbow of switch arm 75 makes electrical connection with spring contact 63, as illustrated in FIG. 4. This closes the series circuit including batteries 57, switch contact 63, switch arm 75, brush contact 73 and flash lamp socket 23. However, the closing of this circuit does not cause the ignition of flash lamp 21 due to the fact that the current provided by batteries 57 is shunted around flash lamp 21 in the direction of the arrows (FIG. 4), namely, through the circuit provided by spring contact 63, adjustable latching bar 31, and striking plate 37. It can be seen that this last described circuit effectively shunts flash lamp 21 until such time as detent 43 of latching bar 31 releases finger 45 of striking plate 37.

Figure 5:
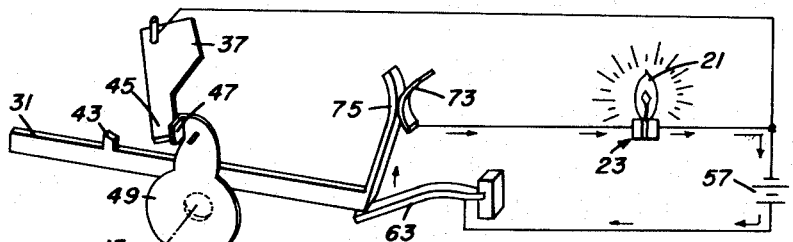
Figure 6:
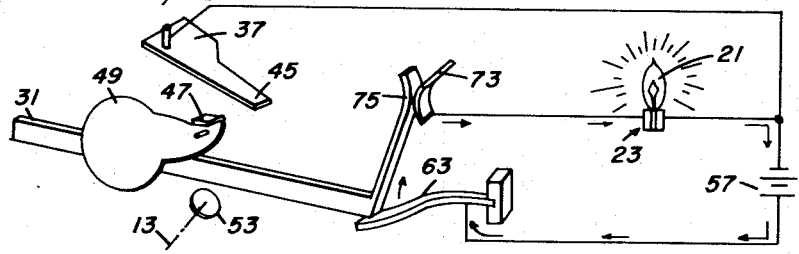

When the operator has fully depressed trigger lever 17, latching bar 31 is rotated sufficiently so that detent 43 releases finger 45, allowing the shutter striking plate to move rapidly in a counterclockwise direction in response to its spring bias. This breaking of the contact between detent 43 and finger 45 opens the shunt circuit, permitting the current provided by batteries 57 to move (as illustrated by the small arrows in FIG. 5) through the series circuit described above. Thus, during the interval of time in which finger 45 of striking plate 37 moves from its initial position to its point of impact with ear 47 of shutter blade 49 (as illustrated in FIG. 5), the current passing through the filament of flash bulb 21 begins to heat that filament to incandescence. Following the impact of finger 45 against ear 47, shutter blade 49 is rotated in a counterclockwise direction away from camera aperture 53 permitting exposure of the film. By this time, the filament of flash lamp 21 has been heated to its ignition temperature and is producing its peak illumination.

Figure 7:
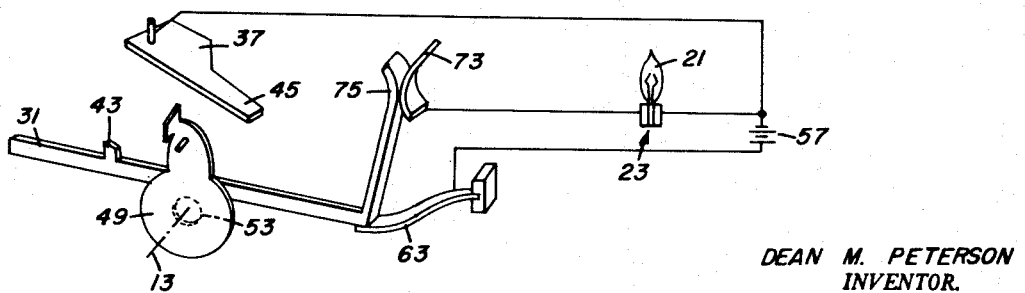

FIG. 7 illustrates that even if the operator continues to hold trigger lever 17 in its fully depressed position after shutter blade 49 is returned by its spring bias to its position capping aperture 53, the current drain on batteries 57 has been stopped by the opening of the filament of flash lamp 21.

It should be noted that the entire shutter and flash operation of the camera is independent of the speed or manner in which the operator depresses trigger lever 17, the time relation between the firing of flash lamp 21 and the opening of shutter blade 49 being controlled completely by the camera mechanism itself once initiated by the full depression of the trigger lever by the camera operator.

(B) *Adjustment of Flash Timing*

As is well known in the art, various types of flash lamps have characteristic curves in which flash lamp illumination is illustrated as a function of elapsed time following energization. The dotted line 81 in FIG. 8 illustrates the assumed characteristic curve of flash lamp 21. It can be seen from characteristic curve 81 that when flash lamp 21 is initially energized at time T–1, a time lapse of approximately 4 units of time, i.e., until time T–5, is required before flash lamp 21 produces its peak illumination of the scene being photographed.

To facilitate explanation of the timing adjustment apparatus, it will be assumed, for the moment, that the vertically hatched area under envelope 83 represents the time that shutter blade 49 is out of its normally capping relation to aperture 53 in response to the impact of striking plate 37. It is further assumed that when finger 45 of striking plate 37 is released at time T–1, a lapse of two units of time occurs prior to the time finger 45 strikes ear 47 to drive blade 49 into motion at time T–3.

Comparing the vertically hatched area under envelope 83 with the characteristic illumination curve 81 for flash lamp 21, it can be seen that the open period of shutter lamp 49—as shown by envelope 83—does not coincide with (or, to put it another way, is not properly synchronized with) the peak illumination time of flash lamp 21, and therefore exposures made under such conditions would be quite unsatisfactory.

To overcome such unsatisfactory synchronization, the invention herein provides a simple, economical means for adjusting the timed relationship between the energization of flash lamp 21 and the opening of shutter blade 49. Referring to FIG. 2, attention is called once again to the fact that latching bar 31 is adjustable in relation to trigger lever 17 by means of screws 33 which are passed through appropriate slots in trigger lever 17. Adjustment of latching bar 31 changes the relative distance between detent 43 and ear 47 of shutter blade 49. The greater this distance, the further arm 45 of shutter striking plate 37 must travel, and the greater the time lapse between the release of arm 45 by detent 43 and the striking of arm 45 against ear 47.

Although latching bar 31 is illustrated as being adjustable at all times by means of screws 33, in actual practice the adjustment of latching bar 31 in an inexpensive camera would probably be made initially by the manufacturer to provide proper synchronization for a particular type of flashlamp, the connection between latching bar 31 and trigger lever 17 being made permanent following such proper adjustment.

Continuing with the assumed fact situation in which the time of shutter operation of shutter blade 49 is as illustrated by envelope 83 in FIG. 8, it can be seen that proper synchronization requires that the uncapping of the camera aperture must be delayed somewhat if it is to be properly synchronized with the characteristic illumination curve for flash lamp 21. To achieve this delay, latching bar 31 must be adjusted to increase the distance between detent 43 and ear 47. If it is assumed that this distance is increased until the time required for the movement of finger 45 though that distance is equal to three units of time, then, under these new conditions of adjustment, the horizontally hatched area under envelope 85 now represents the open period for shutter blade 49, and the coincidence of the uncapping of aperture 53 (as illustrated graphically by envelope 85) and the time of peak illumination of flash lamp 21 (graphically shown by characteristic curve 81) shows that proper synchronization has thus been achieved.

It can be seen that the adjustable mechanism disclosed herein provides a simple means for synchronizing the opening of the shutter with the characteristic illumination curve of flash lamp 21. However, only one specific embodiment of the present invention has been described, the particular form having been selected to facilitate disclosure of the invention rather than to limit in any way the number of forms which the invention may take. Therefore, it is to be understood that various modifications, adaptations, and alterations may be applied to the specific form shown to meet the requirements of practice without in any manner departing from the spirit or scope of the invention herein.

What is claimed is:

1. A flash-and-shutter control mechanism for synchronizing the opening of a camera shutter and the peak illumination of a flash lamp, said camera including
    (a) an impact-type shutter mechanism wherein a shutter blade is driven to an open position out of capping relation to said camera's aperture for a predetermined interval of time by the impact of a shutter-driving member during the latter's movement from a cocked position to a released position,
    (b) a trigger device movable from first position engaging said shutter driving member in said cocked position to a second position releasing said shutter driving member for movement to said released position,
(c) socket means for receiving a flash lamp, and
(d) terminals for electrical connection with a source of voltage, said control comprising:
(e) adjustable means cooperating with said trigger device for controlling the time interval between the release of said shutter driving member by said trigger device and the movement of said shutter blade to said open position,
(f) first circuit means connecting said socket means, said terminals, and said trigger in electrical series relation when said trigger is intermediate said first and second positions and at all positions of said trigger between and including said intermediate and said second position, and
(g) second circuit means including said shutter driving member and said trigger device for establishing a shunt circuit across said socket means so long as said shutter driving plate is in said cocked position.

2. In a control mechanism for automatically firing a flash lamp in synchronism with the operation of a camera shutter, said camera including:
(a) a shutter blade disposed in a rest position in capping relation to said camera's aperture and movable to an open position away from said aperture,
(b) socket means for receiving a flash lamp, and
(c) terminals for connection with a source of electrical potential, the improvement comprising:
(d) electrically conductive shutter-driving means movable from a cocked position to a released position to cause said shutter blade to move to said open position for a predetermined interval of time,
(e) a switch contact,
(f) an electrically conductive trigger movable
(1) from a first position wherein said trigger traps said shutter-driving means when said shutter-driving means is in said cocked position,
(2) through an intermediate position electrically engaging said switch contact,
(3) to a second position for releasing said shutter driving means for movement to said released position,
(g) first circuit means connecting said socket means, said trigger, said switch contact, and said terminals in electrical series relation when said trigger is at all positions of said movement between and including said intermediate and second positions, and
(h) second circuit means including said shutter-driving means and said trigger for shunting said socket means so long as said shutter-driving means is in said cocked position.

3. The construction as defined in claim 2 wherein said trigger includes an adjustable latching means for trapping said shutter-driving means in said cocked position and for controlling the time interval between the opening of said shunting circuit means by release of said shutter-driving means and the movement of said shutter blade to said open position.

4. The construction as defined in claim 3 wherein said shutter blade is driven to said open position by impact of said shutter driving means, and said adjustable latching means controls the time interval between the release of said shutter driving means and the impact of said shutter driving means on said shutter blade.

No references cited.